United States Patent
Jackson et al.

(10) Patent No.: US 9,253,137 B1
(45) Date of Patent: Feb. 2, 2016

(54) CONCURRENT DISPLAY OF CONVERSATION MESSAGES AND SOCIAL NETWORK POSTS BY CONVERSATION MESSAGE AUTHORS

(75) Inventors: Todd Christopher Jackson, San Francisco, CA (US); Edward Shichung Ho, Palo Alto, CA (US); Mark Knichel, Mountain View, CA (US); Emily Chang, Belmont, CA (US)

(73) Assignee: GOOGLE INC., Mountain View, CA (US)

( * ) Notice: Subject to any disclaimer, the term of this patent is extended or adjusted under 35 U.S.C. 154(b) by 237 days.

(21) Appl. No.: 13/218,714

(22) Filed: Aug. 26, 2011

Related U.S. Application Data

(60) Provisional application No. 61/501,124, filed on Jun. 24, 2011.

(51) Int. Cl.
*G06F 15/16* (2006.01)
*H04L 12/58* (2006.01)

(52) U.S. Cl.
CPC ............... *H04L 51/32* (2013.01); *H04L 51/36* (2013.01)

(58) Field of Classification Search
None
See application file for complete search history.

(56) References Cited

U.S. PATENT DOCUMENTS

| | | |
|---|---|---|
| 8,892,666 B1 | 11/2014 | Jackson et al. |
| 2005/0160167 A1* | 7/2005 | Cheng et al. ................. 709/224 |
| 2009/0031232 A1* | 1/2009 | Brezina et al. ............... 715/764 |
| 2009/0106415 A1* | 4/2009 | Brezina et al. ............... 709/224 |
| 2009/0106676 A1* | 4/2009 | Brezina et al. ............... 715/763 |
| 2010/0180001 A1 | 7/2010 | Hardt |
| 2010/0198741 A1* | 8/2010 | Horowitz ............... G06Q 50/01 705/319 |
| 2011/0010182 A1* | 1/2011 | Turski .................. G06Q 10/107 705/1.1 |
| 2011/0087972 A1 | 4/2011 | Swink et al. |
| 2011/0112912 A1* | 5/2011 | Wu ........................... 705/14.73 |
| 2011/0196933 A1* | 8/2011 | Jackson et al. ................ 709/206 |
| 2012/0072358 A1* | 3/2012 | Famous et al. ................ 705/319 |

* cited by examiner

*Primary Examiner* — Mohamed Wasel
*Assistant Examiner* — Tsung Wu
(74) *Attorney, Agent, or Firm* — Morgan, Lewis & Bockius LLP

(57) ABSTRACT

A client device displays message content from one or more email messages in a conversation thread. The client device displays, concurrently with the message content from the one or more email messages, one or more respective social network objects. Each displayed social network object has one or more selection portions, and each displayed social network object corresponds to a respective post by a respective participant in the conversation thread. In response to selection of a first portion of a respective social network object of the one or more displayed social network objects, the client device displays a respective social network page of the respective participant who authored the respective post corresponding to the respective social network object.

21 Claims, 10 Drawing Sheets

| User Identifier 536-1 | No. of Displayed Posts 538-1 | Timestamp of Last Display 540-1 | Affinity 542-1 |
|---|---|---|---|
| ... | ... | ... | ... |
| User Identifier 536-z | No. of Displayed Posts 538-z | Timestamp of Last Display 540-z | Affinity 542-z |

Displayed Posts Data 120

Figure 5B

616 In response to user selection of a first portion of a respective social network object of the one or more displayed social network objects, display a respective social network page of the respective participant who authored the respective post corresponding to the respective social network object.

618 In response to user selection of a second portion of the one or more selectable portions of the respective social network object, display the entire post corresponding to the respective social network object 620 In response to user selection of a third portion of the one or more selectable portions of the respective social network object, adjust a score of the post corresponding to the respective social network object 622 In response to user selection of a fourth portion of the one or more selectable portions of the respective social network object, display the respective social network page and a predefined area for user entry of a comment

Figure 6B

```
                                            ⬐ 700
┌─────────────────────────────────────────────────────────────────┐
│ 702  Receive from a client device a request.  The request       │
│ includes a request for message content from one or more email   │
│ messages in a conversation thread.                              │
│ ┌─────────────────────────────────────────────────────────────┐ │
│ │ 704  The request received from the client device includes a │ │
│ │ request for information corresponding to one or more posts  │ │
│ │ authored by one or more participants in the conversation    │ │
│ │ thread                                                      │ │
│ └─────────────────────────────────────────────────────────────┘ │
└─────────────────────────────────────────────────────────────────┘
                                 ↓
┌─────────────────────────────────────────────────────────────────┐
│                   706  Respond to the request                   │
│                                                                 │
│  ┌───────────────────────────────────────────────────────────┐  │
│  │ 708  Identify the message content from the one or more    │  │
│  │        email messages in the conversation thread          │  │
│  └───────────────────────────────────────────────────────────┘  │
│                                 ↓                               │
│  ┌───────────────────────────────────────────────────────────┐  │
│  │  710  Identify candidate authors in accordance with the   │  │
│  │                          request                          │  │
│  │                                                           │  │
│  │ ┌───────────────────────────────────────────────────────┐ │  │
│  │ │ 712  Identifying the candidate authors includes       │ │  │
│  │ │ identifying one or more candidate authors specified   │ │  │
│  │ │ by the received request                               │ │  │
│  │ └───────────────────────────────────────────────────────┘ │  │
│  │                                                           │  │
│  │ ┌───────────────────────────────────────────────────────┐ │  │
│  │ │ 714  Identifying the candidate authors includes       │ │  │
│  │ │ identifying one or more authors of messages in the    │ │  │
│  │ │ conversation thread                                   │ │  │
│  │ └───────────────────────────────────────────────────────┘ │  │
│  │                                                           │  │
│  │ ┌───────────────────────────────────────────────────────┐ │  │
│  │ │ 716  Identifying the candidate authors includes       │ │  │
│  │ │ identifying one or more participants in the           │ │  │
│  │ │ conversation thread                                   │ │  │
│  │ └───────────────────────────────────────────────────────┘ │  │
│  └───────────────────────────────────────────────────────────┘  │
│                                 ↓                               │
│                                (B)                              │
└─────────────────────────────────────────────────────────────────┘
```

Figure 7A

CONCURRENT DISPLAY OF CONVERSATION MESSAGES AND SOCIAL NETWORK POSTS BY CONVERSATION MESSAGE AUTHORS

RELATED APPLICATIONS

This application claims priority to U.S. Provisional Application Ser. No. 61/501,124, filed Jun. 24, 2011, entitled "Concurrent Display of Conversation Messages and Social Network Posts by Conversation Message Authors," which is incorporated by reference herein in its entirety.

This application is related to U.S. patent application Ser. No. 13/218,724, filed Aug. 26, 2011, entitled "Integration System Providing Conversation Messages and Social Network Posts by Conversation Message Authors to Client," which is incorporated by reference herein in its entirety.

TECHNICAL FIELD

The disclosed embodiments relate generally to displaying social network posts. More particularly, the disclosed embodiments relate to methods and systems for concurrently displaying conversation messages and social network posts.

BACKGROUND

Electronic messages are widely used as communication media, as more people gain access to computer networks (e.g., the Internet) and people use computer networks for more activities. In addition, more people post comments or share items (e.g., web pages, products, or comments made by other users) online. However, existing methods are not efficient at displaying user comments or shared items.

SUMMARY

Accordingly, there is a need for a new method and system for displaying the user comments and/or shared items.

A number of embodiments (e.g., of server systems, client systems or devices, and methods of operating such systems or devices) that overcome the limitations and disadvantages described above are presented in more detail below. These embodiments provide methods, systems, and graphical user interfaces (GUIs) for displaying user-generated data (e.g., posts or annotations).

As described in more detail below, some embodiments involve a method performed by a client device that has one or more processors and memory storing one or more programs for execution by the one or more processors. The method includes displaying message content from one or more email messages in a conversation thread; and displaying, concurrently with the message content from the one or more email messages, one or more respective social network objects. Each displayed social network object has one or more selection portions, and each displayed social network object corresponds to a respective post by a respective participant in the conversation thread. The method includes, in response to selection of a first portion of a respective social network object of the one or more displayed social network objects, displaying a respective social network page of the respective participant who authored the post corresponding to the respective social network object.

In accordance with some embodiments, a method is performed by a client device that has one or more processors and memory storing one or more programs for execution by the one or more processors. The method includes displaying message content from one or more email messages; and displaying, concurrently with the message content from the one or more email messages, one or more respective social network objects. Each displayed social network object has one or more selection portions, and each displayed social network object corresponds to a respective post by a respective participant in the one or more email messages. The method includes, in response to selection of a first portion of a respective social network object of the one or more displayed social network objects, displaying a respective social network page of the respective participant who authored the respective post corresponding to the respective social network object.

In accordance with some embodiments, a method is performed by a server that has one or more processors and memory storing one or more programs for execution by the one or more processors. The method includes receiving from a client device a request. The request includes a request for message content from one or more email messages in a conversation thread. The method includes responding to the request by: identifying the message content from the one or more email messages in the conversation thread; identifying candidate authors in accordance with the request; obtaining qualifying posts by the candidate authors, where the qualifying posts satisfy predefined criteria; selecting a subset of the qualifying posts; and preparing the selected subset of the qualifying posts and the message content for concurrent display at the client device.

In accordance with some embodiments, a method is performed by a server that has one or more processors and memory storing one or more programs for execution by the one or more processors. The method includes receiving from a client device a request. The request includes a request for message content from one or more email messages. The method includes responding to the request by: identifying the message content from the one or more email messages; identifying candidate authors in accordance with the request; obtaining qualifying posts by the candidate authors, where the qualifying posts satisfy predefined criteria; and preparing a subset of the qualifying posts and the message content for concurrent display at the client device.

In accordance with some embodiments, a computer system comprises one or more processors for executing programs and memory storing one or more programs for execution by the one or more processors. The one or more programs include instructions to perform any of the aforementioned methods.

In accordance with some embodiments, a non-transitory computer readable storage medium stores one or more programs configured for execution by one or more processors of a computer system. The one or more programs include instructions for performing any of the aforementioned methods.

In accordance with some embodiments, a client system includes one or more processors; and memory storing one or more programs for execution by the one or more processors. The one or more programs include instructions for displaying message content from one or more email messages in a conversation thread, and displaying, concurrently with the message content from the one or more email messages, one or more respective social network objects. Each displayed social network object has one or more selection portions, and each displayed social network object corresponds to a respective post by a respective participant in the conversation thread. The one or more programs also include instructions for, in response to selection of a first portion of a respective social network object of the one or more displayed social network objects, displaying a respective social network page of the respective participant who authored the respective post corresponding to the respective social network object.

In accordance with some embodiments, a non-transitory computer readable storage medium stores one or more programs configured for execution by one or more processors of a client system. The one or more programs include instructions for displaying message content from one or more email messages in a conversation thread, and displaying, concurrently with the message content from the one or more email messages, one or more respective social network objects. Each displayed social network object has one or more selection portions, and each displayed social network object corresponds to a respective post by a respective participant in the conversation thread. The one or more programs include instructions for, in response to selection of a first portion of a respective social network object of the one or more displayed social network objects, displaying a respective social network page of the respective participant who authored the respective post corresponding to the respective social network object.

Thus, computer systems are provided with more efficient methods for displaying message content and social network objects, thereby increasing the effectiveness and efficiency in sharing information among multiple users. Such methods may complement or replace conventional methods for displaying message content.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 5B is a block diagram illustrating exemplary displayed posts data, in accordance with some embodiments.

FIGS. 6A-6B are flowcharts representing a method of concurrently displaying message content and one or more social network objects, in accordance with some embodiments.

FIGS. 7A-7B are flowcharts representing a method of preparing a set of qualifying posts and message content for concurrent display, in accordance with some embodiments.

DESCRIPTION OF EMBODIMENTS

Methods and systems for concurrently displaying message content and one or more social network objects are described. Reference will be made to certain embodiments, examples of which are illustrated in the accompanying drawings.

Moreover, in the following description, numerous specific details are set forth to provide a thorough understanding of the embodiments. However, it will be apparent to one of ordinary skill in the art that some embodiments may be practiced without these particular details. In other instances, methods, procedures, components, and networks that are well-known to those of ordinary skill in the art are not described in detail to avoid obscuring aspects of the embodiments described in this document.

It will also be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion. The first portion and the second portion are both portions, but they are not the same portion.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination," "upon detecting" or "in response to detecting" that the stated condition precedent is true, depending on the context.

As used herein, the term "URL" refers to a uniform resource locator, which is sometimes called a uniform resource identifier (URI).

Figure 1:
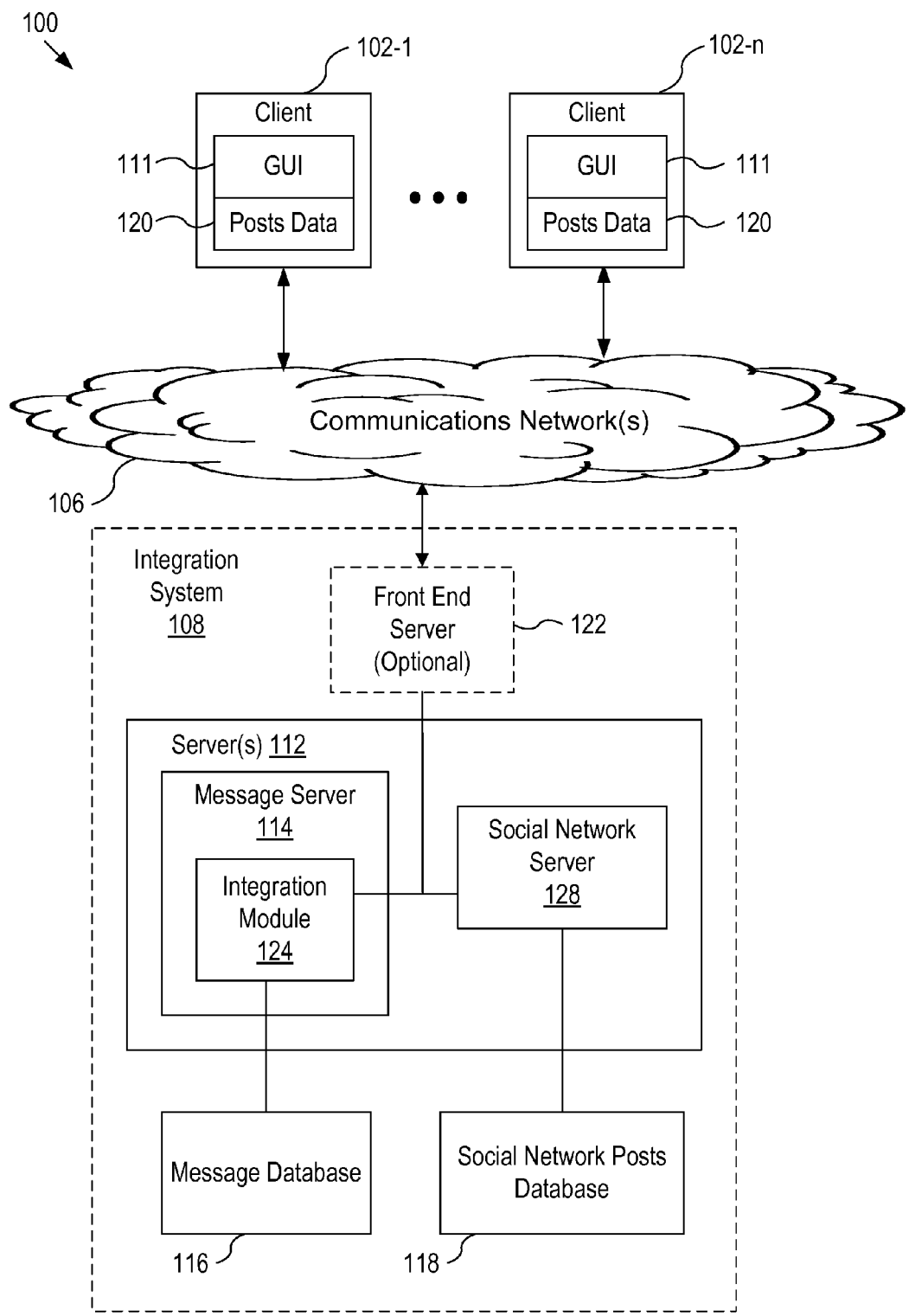
FIG. 1 is a block diagram illustrating an exemplary distributed computer system, in accordance with some embodiments.

FIG. 1 is a block diagram illustrating an exemplary distributed computer system 100, according to certain embodiments. In FIG. 1, system 100 includes one or more client computers 102, communications network 106, and integration system 108. Various embodiments of the integration system 108 implement the methods described in this document.

Client computers 102 can be any of a number of computing devices (e.g., Internet kiosk, personal digital assistant, cell phone, gaming device, desktop computer, laptop computer, tablet computer, handheld computer, or combinations thereof) used to enable the activities described below. Client computer(s) 102 is also referred to herein as client(s), client device(s), or client system(s). Client 102 typically includes a graphical user interface (GUI) 111 and posts data 120. Client 102 is described in greater detail below with reference to FIG. 3. Client 102 is connected to integration system 108 via communications network 106. As described in more detail below, GUI 111 is used to display message content and one or more social network objects.

Integration system 108 includes one or more servers, such as servers 112, connected to communications network 106. Optionally, servers 112 are connected to communications network 106 via front end server 122. In some embodiments, front end server 122 conveys (and optionally parses) inbound requests to the appropriate server of integration system 108, and formats responses and/or other information being sent to clients in response to requests. Front end server 122, if present, may be a web server providing web based access to integration system 108. Front end server 122, if present, may also route communications to and from other destinations, such as a remote online service server (e.g., a remote email server, remote social network server, etc.).

Integration system 108 typically includes message database 116 and social network posts database 118. In some embodiments, integration system 108 also includes or has access to one or more other databases, such as a user information database (not shown) that includes user authentication information. In embodiments illustrated by FIG. 1, servers 112 include message server 114 and social network server 128. Message server 114 communicates with message database 116, and social network server 128 communicates with social network posts database 118. Respective servers 112 communicate with one or more respective databases internal to integration system 108, such as message database 116 and social network posts database 118 using a local area network, by internal communication busses, or by any other appropriate mechanism or combination of mechanism.

Servers 112 are also referred to herein as a server system. Servers 112 communicate with other servers (e.g., a user authentication server (not shown)) and/or clients 102 via front end server 122 (if present) and communications network 106. In some embodiments, communications network 106 is the Internet, other wide area network (WAN), metropolitan area network, local area network (LAN), or a combination of such networks.

Servers 112 also include application programs and/or modules that are executed by one or more of the servers to manage integration system 108. In some embodiments, one or more servers in servers 112 include integration module 124, which assists in integrating operations of multiple servers in the server(s) 112. More generally, servers 112 are configured to manage certain aspects of integration system 108, including transmitting data (including message content and one or more posts) to a respective client 102 for rendering at least a portion of the data on GUI 111 of the respective client 102.

Optionally, integration system 108 is implemented as a system remote from message server 114 and/or social network server 128.

The servers and modules shown in integration system 108 and servers 112 represent functions performed in certain embodiments. In some embodiments, fewer and/or additional servers, modules, functions or databases are included in integration system 108 and server(s) 112.

Figure 2:
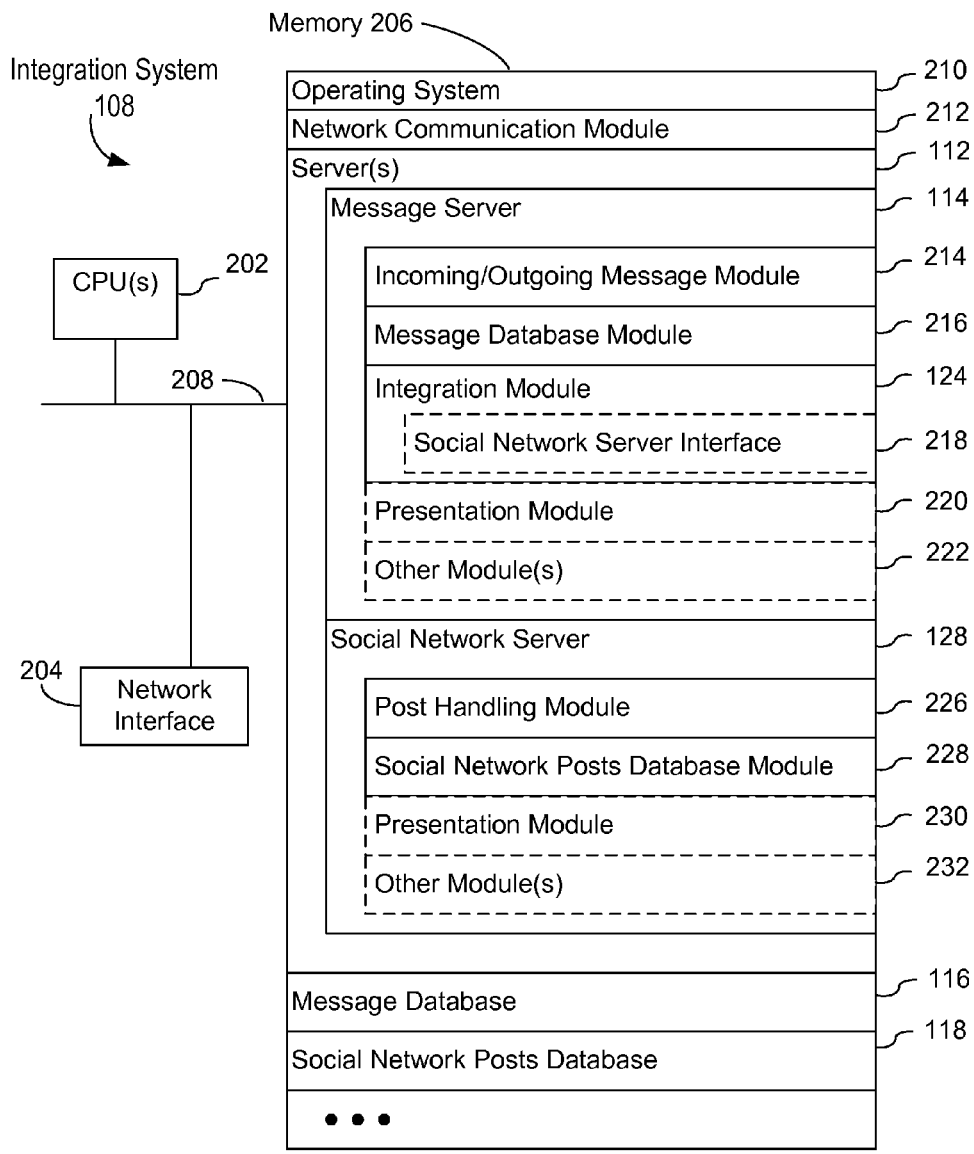
FIG. 2 is a block diagram illustrating an integration system, in accordance with some embodiments.

FIG. 2 is a block diagram illustrating integration system 108 in accordance with some embodiments. Integration system 108 typically includes one or more processing units (sometimes called CPUs or processors) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, integration system 108 includes a user interface (not shown) (e.g., a user interface having a display device, a keyboard, and a mouse or other pointing device), but more typically integration system 108 is controlled from and accessed by various client systems (e.g., client 102, FIG. 1).

Memory 206 of integration system 108 includes high-speed random access memory, such as DRAM, SRAM, DDR RAM or other random access solid state memory devices; and typically also includes non-volatile memory, such as one or more magnetic disk storage devices, optical disk storage devices, flash memory devices, or other non-volatile solid state storage devices. Memory 206 optionally includes one or more storage devices remotely located from the processor(s) 202. Memory 206, or alternately the non-volatile memory device(s) within memory 206, comprises a non-transitory computer readable storage medium for storing information. In some embodiments, memory 206 or the computer readable storage medium of memory 206 stores the following programs, modules and data structures, or a subset thereof:

- Operating System 210, which includes procedures for handling various basic system services and for performing hardware dependent tasks;
- Network Communication Module (or instructions) 212, which is used for connecting integration system 108 to other computers (e.g., clients 102 or any remote servers) via one or more communications interfaces 204 and one or more communications networks 106 (FIG. 1), such as the Internet, other wide area networks, local area networks, metropolitan area networks, and so on;
- Server(s) 112, which typically include message server 114 and/or social network server 128; and
- Message Database 116, which includes messages (e.g., email messages) sent and/or received by users of integration system 108; and
- Social Network Posts Database 118, which includes social network posts (also called posts), sent and/or received by users of integration system 108; optionally, the social network posts include blog posts, microblog messages, web posts, web comments, reposts, etc.).

In some embodiments, message database 116 includes email messages only, and social network posts database 118 includes various forms of social network posts other than emails. In other embodiments, social network posts database 118 include various forms of social network posts regardless of whether the social network posts are distributed additionally as email messages.

In some embodiments, social network server 128 includes post handling module 226 for receiving and presenting social network posts. In some embodiments, post handling module 226 works in conjunction with front end server 122 (FIG. 1), which provides a user-interface (e.g., a web page) for displaying social network posts. In such embodiments, front end server 122 sends display information to client 102, which enables client 102 to display a respective user a respective user-interface that includes one or more social network posts by users other than the respective user. In addition, the front end server 122 typically receives social network posts submitted by the respective user through the user-interface. In some embodiments, the front end server 122 parses the one or more social network posts (e.g., strips one or more portions of the header) prior to transmitting the one or more social network posts to post handling module 226, which processes the one or more social network posts (e.g., updates a post history of the respective user).

In some embodiments, social network server 128 includes social network posts database module 228 which assists in storing and retrieving social network posts in social network posts database 118. In some embodiments, social network posts database module 228 assists in updating social network posts or metadata associated with social network posts in social network posts database 118 (e.g., updating a score of a respective social network post in accordance with feedback from one or more other users, and/or associating one or more related social network posts, such as comments).

In some embodiments, social network server 128 includes presentation module 230, which formats one or more social network posts in social network posts database 118 for display at respective clients 102 (e.g., as a web page).

Optionally, social network server 128 includes one or more other module(s) 232.

In some embodiments, message server 114 includes incoming/outgoing message module 214 for receiving or sending messages. Incoming/outgoing message module 214 typically uses network communication module 212 to communicate with other remote message servers used by other users (e.g., via POP or IMAP protocols).

In some embodiments, message server 114 includes message database module 216 which assists in storing and retrieving messages in message database 116. In some embodiments, message database module 216 also assists in updating messages or meta data (e.g., last accessed time) associated with messages in message database 116.

In some embodiments, message server 114 includes integration module 124 for integrating the functionality of message server 114 and social network server 128. In some embodiments, integration module 124 includes social network server interface 218, which is used to retrieve one or more social network posts stored in social network posts database 118 via social network server 128. For example, integration module 124 is configured to send a request for one or more social network posts to social network server 128, and social network server 128 is configured to, in response, retrieve and send to integration module 124 the one or more social network posts, or at least a subset thereof.

In some embodiments, message server 114 includes presentation module 220, which formats one or more messages in message database 116 and one or more social network posts in social network posts database 118 for display at respective clients 102. For example, presentation module 220 may generate a web page or XML document that includes messages and social network posts. In some embodiments, presentation module 220 is executed by the front end server 112 (FIG. 1) instead of message server 114. Therefore, in some embodiments, presentation module 220 is located in the front end server 112. In some embodiments, presentation module 220 of message server 114 comprises presentation module 230 of social network server 230, or vice versa.

Optionally, message server 114 includes one or more other module(s) 222.

Each of the above identified servers, modules and interfaces corresponds to a set of instructions for performing one or more functions described above. These servers and modules (i.e., sets of instructions) need not be implemented as separate software programs, procedures or modules, and thus various subsets of these modules may be combined or otherwise re-arranged in various embodiments. In some embodiments, memory 206 or the computer readable storage medium of memory 206 stores a subset of the modules and data structures identified above. Furthermore, memory 206 or the computer readable storage medium of memory 206 stores additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, one or more of message database 116 and social network posts database 118 are part of or stored within server(s) 112. In other embodiments, one or more of message database 116 and social network posts database 118 are implemented using one or more servers whose primary function is to store and process communication data, at least a subset of which may be located remotely from message server 114 and/or social network server 128. In some embodiments, message database 116 includes social network posts database 118, or vice versa. In some embodiments, message server 114 and social network server 128 are implemented in separate systems.

The number of servers used to implement integration system 108 and how features are allocated among them will vary from one implementation to another, and may depend in part on the amount of data stored by integration system 108, and may also depend on the amount of data traffic that the system must handle during peak usage periods as well as during average usage periods. Moreover, one or more of the blocks (e.g., server(s) 112, message database 116, etc.) in FIG. 1 may be implemented on one or more servers designed to provide the described functionality. Although the description herein refers to certain features implemented in client 102 and certain features implemented in server(s) 112, the embodiments are not limited to such distinctions. For example, features described herein as being part of server(s) 112 can be implemented in whole or in part in client 102, and vice versa. In some embodiments, features described herein as being part of server(s) 112 can be implemented in whole or in part in multiple distributed servers.

Figure 3:
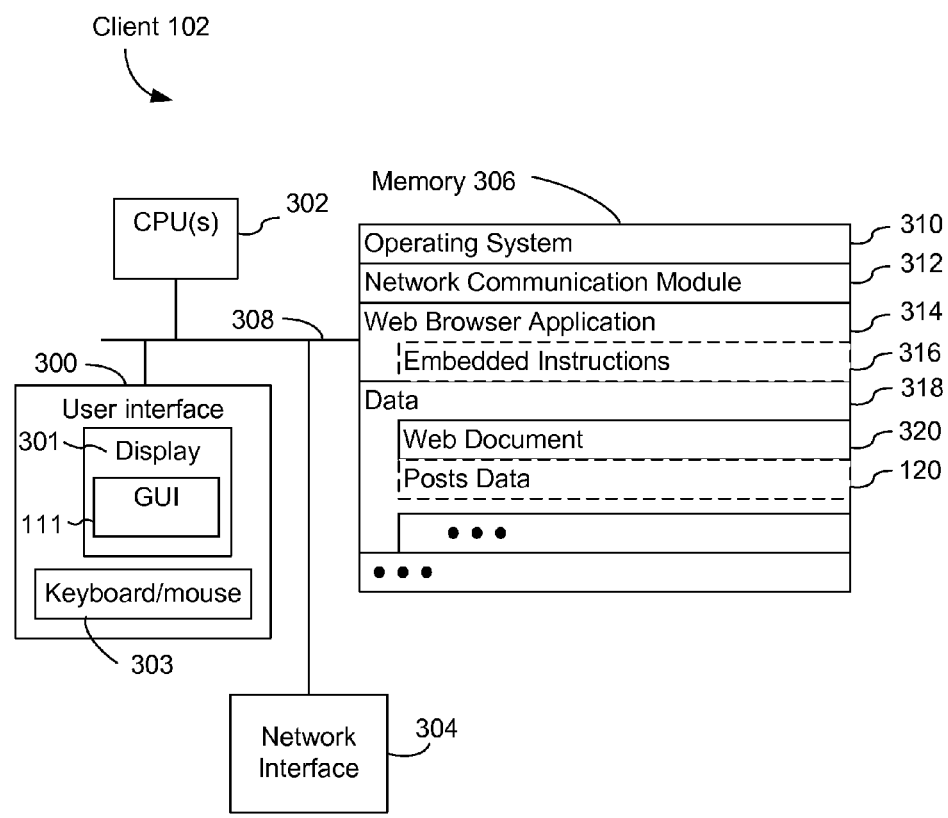
FIG. 3 is a block diagram illustrating a client, in accordance with some embodiments.

FIG. 3 is a block diagram illustrating client 102, also called a client system or a client device, in accordance with some embodiments. Clients 102 are configured for use by a subscriber (also herein called "the user") of integration system 108 or message server 114. Client 102 includes user interface 300, which typically includes display device 301, and one or more input devices 303 such as a keyboard and a mouse or other pointing device. Optionally, input devices 303 include, or are implemented using a touch sensitive surface of display device 301, or of a touch pad. As noted above, client 102 includes graphical user interface (GUI) 111, which is displayed on display device 301. Client 102 typically includes one or more processing units (sometimes called CPUs or processors) 302, one or more network or other network communications interfaces 304, memory 306, and one or more communication buses 308 for interconnecting these components. Communication buses 308 may include circuitry (sometimes called a chipset) that interconnects and controls communications between system components.

Memory 306 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 306 optionally includes one or more storage devices remotely located from the processor(s) 302. Memory 306, or alternately the non-volatile memory device(s) within memory 306, comprises a non-transitory computer readable storage medium for storing information. In some embodiments, memory 306 or the computer readable storage medium of memory 306 stores the following programs, modules and data structures, or a subset thereof:

Operating System 310, which includes procedures for handling various basic system services and for performing hardware dependent tasks;

Network Communication Module (or instructions) 312, which is used for connecting client 102 to other computers (e.g., integration system 108 and/or other clients 102) via network communications interface 304 and one or more communications networks 106 (FIG. 1), such as the Internet, other wide area networks, metropolitan area networks, local area networks, or a combination of such networks;

Web Browser Application 314, which processes and initiates display of a web document (e.g., 320) in GUI 111; and Data 318, which includes web documents (e.g., 320, etc.) and in some embodiments, posts data 120.

Optionally, memory 306 includes additional applications. In some embodiments, web browser application 314 or an extension, plug-in or toolbar of web browser application 314 includes embedded instructions 316 that send requests for, and receives, one or more messages and/or one or more social network posts from integration system 108 (FIG. 1).

Respective web document 320 is typically a webpage (or XML document or the like) received from integration system 108 for display of messages (e.g., email messages). The respective web document includes information for display in GUI 111. In some embodiments, respective web document 320 includes embedded instructions for receiving document-related input from a computer user (e.g., draft email or inputs for social network posts) and for formatting web document 320 for display in GUI 111.

Posts data 120 identifies one or more participants (e.g., sender(s) and/or receiver(s)) in emails sent or received by client 102 (i.e., emails sent or received by a respective user using client 102). In some embodiments, posts data 120 includes information about social network posts currently and previously displayed by client 102. This information is used to avoid or reduce repeated display of the same social network posts. In some embodiments, the information in posts data 120 is sent to integration system 108 in conjunction with a request for one or more social network posts, and integration system 108 selects the one or more social network posts in accordance with the information.

In some embodiments, posts data 120 is maintained while web browser application 314 is being executed by the one or more processing units (also called processors) 302 of client 102. Optionally, posts data 120 is removed or cleaned when web browser application 314 is terminated. Optionally posts data 120 is removed or cleaned when the user of client 102 explicitly logs out of an online email service. Posts data 120 is described in detail with respect to FIG. 5B.

Figure 4:
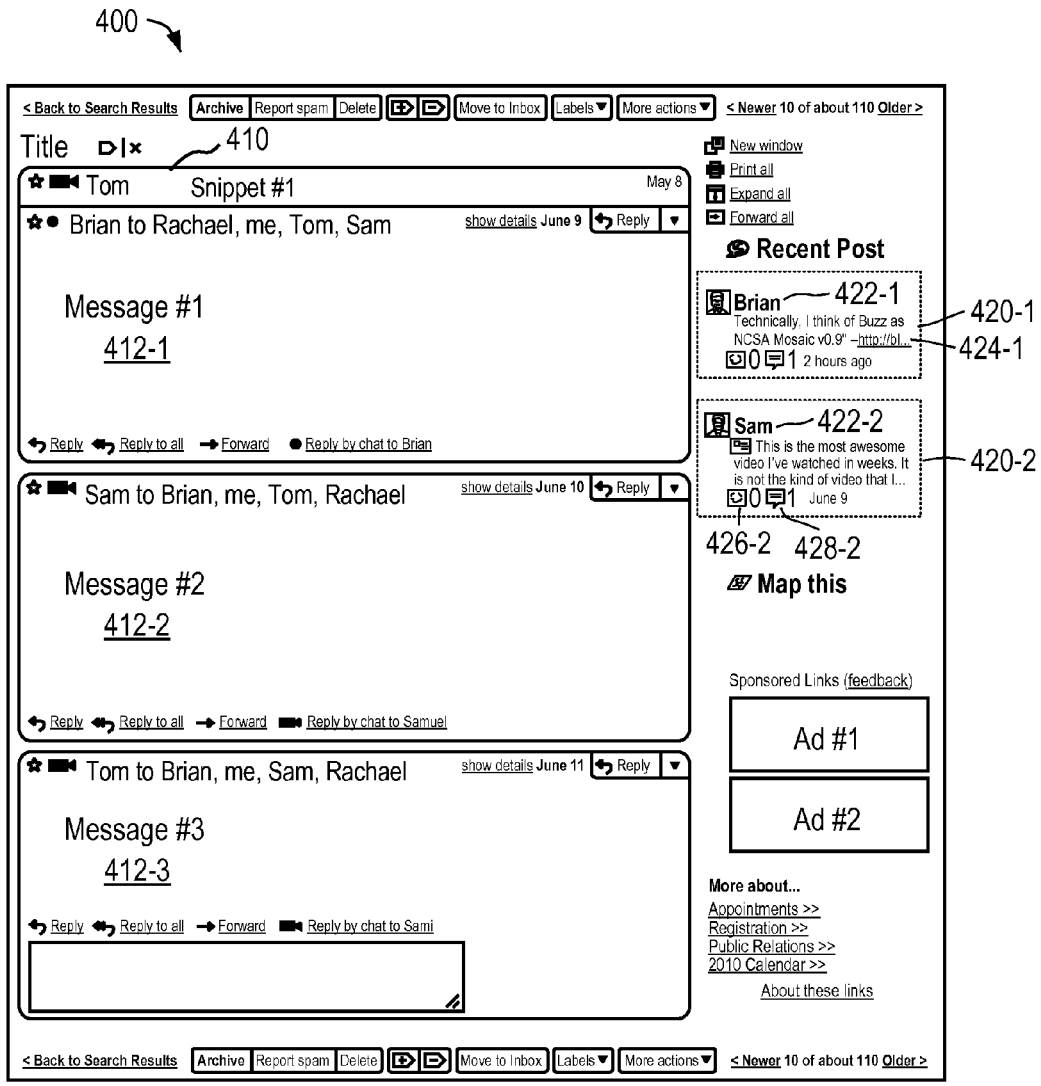
FIG. 4 illustrates an exemplary user interface displayed at a client, in accordance with some embodiments.

FIG. 4 illustrates exemplary user interface 400 displayed in GUI 111 of client 102, in accordance with some embodiments. User interface 400 includes a message page for displaying message content from a plurality of email messages (e.g., 410 and 412-1 through 412-3) in a conversation thread. Email messages in the conversation thread typically have the same title (sometimes called the subject or subject line). In determining whether two emails have the same title, predefined prefixes, such as "Re:", "Fw:", and "Fwd:", variants thereof (e.g., all characters in capital letters or all characters in lower cases), and any combination thereof (e.g., "Re: Re: Re:" or "Re: FW:") is disregarded. For example, respective emails, each with respective titles: "Hello", "Re: Hello", "Re: Re: Hello", and "Fw: Hello" may be included in the same conversation thread. Typically, each email message in the conversation thread has one or more common participants (e.g., either as a sender or receiver). For example, messages 412-1 through 412-3 each have Brian, Rachel, me, Tom, and Sam as participants.

In FIG. 4, the plurality of email messages includes email message 410 for which only a snippet (e.g., a portion of the email message 410) is displayed. A snippet typically includes a predefined number of consecutive characters in the email message. In some embodiments, the predefined number is selected in accordance with the size (or resolution) of display 301 (FIG. 3) and the size of the font displayed on display 301 for displaying the snippet. Alternatively, the snippet is generated in accordance with a requirement that the number of characters in the snippet falls within a predefined range. In some embodiments, the snippet comprises a one-line summary of the email message (e.g., words in the beginning of message 410 that fits into one line).

In some embodiments, the plurality of email messages includes at least one email message 412 for which message content is displayed in full, with or without quoted text. For example, if a reply email includes an original email as a quoted text, a display of the reply email may not include the original email for brevity, even when the reply email is displayed in full. Instead, the quoted text is elided and represented by a link that the user can select so as to display the quoted text.

User interface 400 also includes social network objects 420 (e.g., 420-1 and 420-2). Each social network object 420 corresponds to a social network post. In some implementations, each social network object 420 includes at least a subset of text in the corresponding social network post. In some implementations, each social network object 420 includes an author identifier 422 (e.g., an author name, nickname, username, a thumbnail photo, or any other identification). For example, social network object 420-1 includes author identifier 422-1 for a user named "Brian," indicating that a social network post corresponding to social network object 420-1 is authored by the user "Brian." Social network object 420-2 includes an author identifier 422-2 for a user named "Sam," indicating that a social network post corresponding to social network object 420-2 is authored by the user "Sam." It is noted that "Brian" and "Sam" are participants in email messages 412-1 through 412-3 shown in FIG. 4. For example, Brian is an author of message 412-1 and also a recipient of messages 412-2 and 412-3. Sam is an author of message 412-2 and also a recipient of messages 412-1 and 412-3.

In some embodiments, social network object 420-1 includes link 424-1 to a related webpage. In some embodiments, the link 424-1 is a hyperlink that includes a URL of the related webpage.

In some embodiments, a respective social network object (e.g., object 420-2) includes rating icon 426-2 that can be selected to adjust the score for social network object 420-2 (e.g., a "like" or "+1" button). For example, in response to user selection of rating icon 426-2, the score of social network object 420-2 is increased. Typically, the score of social network object 420-2 is displayed adjacent to rating icon 426-2.

In some embodiments, a respective social network object 420-2 (e.g., object 420-2) includes a comment icon 428-2 that can be selected to provide a comment on social network object 420-2 or a corresponding social network post. For example, in response to user selection of comment icon 428-2, a comment input box (not shown) or a comment input page is displayed. In some embodiments, the number of comments on social network object 420-2 or a corresponding social network post is displayed adjacent to comment icon 428-2.

In some embodiments, social network object 420 includes a timestamp (e.g., a timestamp indicating when a corresponding social network post was authored). For example social network object 420-1 includes a timestamp indicating that a corresponding social network post was authored 2 hours ago.

In some embodiments, a respective social network object 420 includes a graphical boundary (e.g., a perimeter, a background image or pattern having an outer boundary, etc.). In other embodiments, a respective social network object 420 does not include a graphical boundary.

Figure 5A:
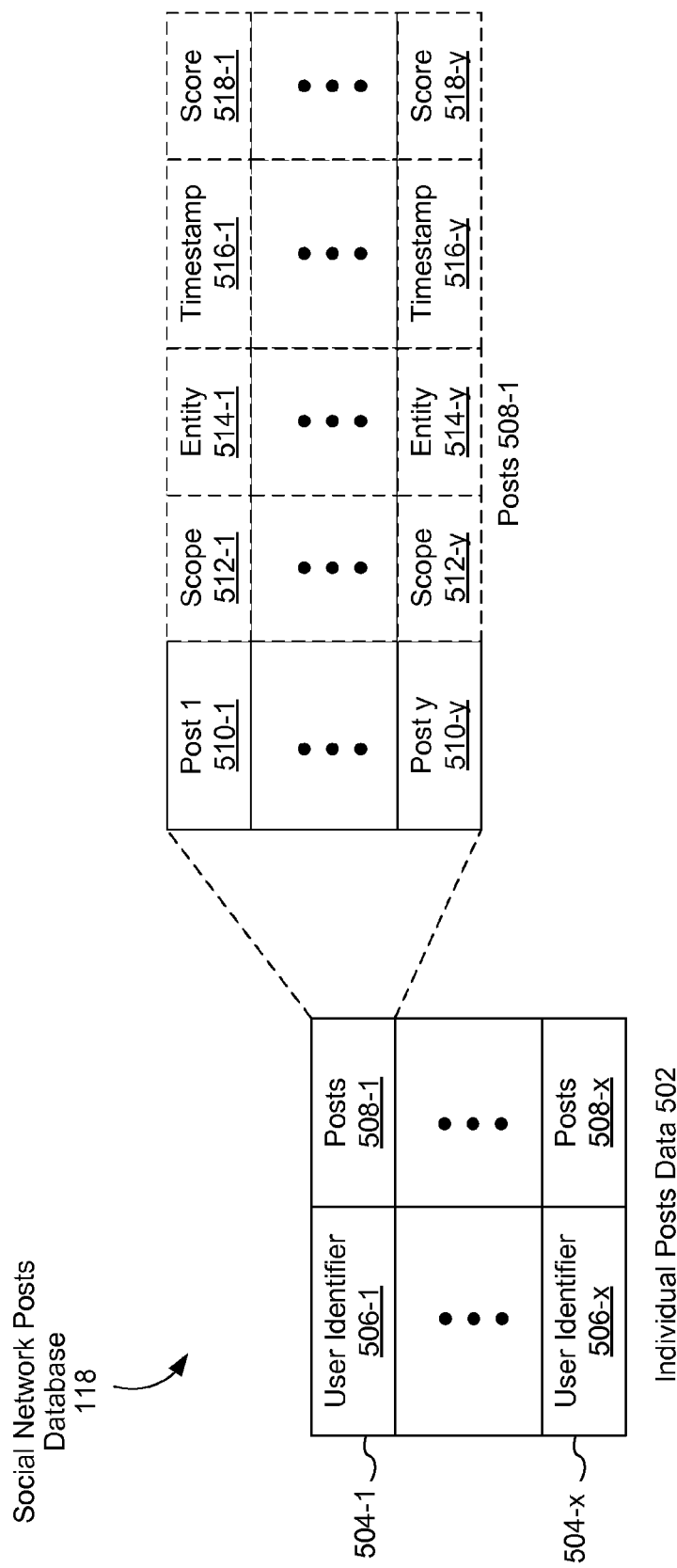
FIG. 5A is a block diagram illustrating exemplary individual posts data, in accordance with some embodiments.

FIG. 5A is a block diagram illustrating exemplary individual posts data 502, in accordance with some embodiments.

Individual posts data 502 is stored in social network posts database 118 (FIG. 1). Individual posts data 502 includes individual posts entries (or personal posts entries), for example entry 1 (504-1) through entry x (504-x), where x represents the number of entries in individual posts data 502. Each entry 504 is for a respective individual or respective user identifier (e.g., database 118 would include two entries 504 for a user who makes posts under two different user identifiers). A respective entry (e.g., entry 504-1) includes a user identifier (e.g., 506), such as a username, email address, etc. of the user who made or posted posts 508. The respective entry (e.g., entry 504-1) also includes posts (e.g., 508-1). Posts (e.g., 508-1) include one or more posts (e.g., 510-1 through 510-y) made by a user represented by a respective user identifier (e.g., 506-1).

A respective post (e.g., 510-1) may be a user's original post, or comment on or sharing of an existing post. In some embodiments, respective post 510 has one or more of: scope 512, entity 514, timestamp 516 and score 518.

Scope 512, sometimes called the access scope or publication scope, indicates users or one or more groups of users who may access respective post 510 and/or information about the respective post 510. For example, scope 512 for a particular post includes a list of user identifiers (e.g., usernames), a list of one or more groups (e.g., a "family" group that typically includes one or more family members of a respective user), and/or a "public" scope, which indicates that anyone may access the respective post or information about the respective post.

Entity 514, if included, may be the URL of the respective web page that is the subject of the post. In other words, entity 514 represents an entity annotated (or commented) by the respective post 510. For example, when a user posts a comment about a video clip on a web page, an identifier of the web page that includes the video clip may be stored as entity 514 of the user post. In some embodiments, entity 514 may include the URL of the web page. Alternatively, entity 514 may be represented by an identifier that corresponds to the URL of the web page. For example, entity 514 may be a fixed length identifier (e.g., a hash of the URL of the web page, produced by applying a predefined hash function to the URL).

Timestamp 516 indicates the time when respective annotation 510 was posted or recorded.

Score 518 is or includes a value, which is typically a value indicative of popularity of the respective post 504, in accordance with predefined popularity criteria. In other implementations score 518 includes a value determined in accordance with one or more predefined score metrics or score criteria. In some implementations, score 518 includes multiple values, each corresponding to different scoring criteria or a different score metric. I some embodiments, score 518 is or includes a value corresponding to a number to times the respective post 504 has been reposted, commented on, recommended (e.g., by user selection of a "like" or "+1" affordance), or responded to.

FIG. 5B is a block diagram illustrating exemplary displayed posts data 120, in accordance with some embodiments. In some embodiments, displayed posts data 120 is stored in client 102 (e.g., posts data 120, FIG. 1). Displayed posts data 532 include information regarding various posts displayed by client 102, typically during while the web browser application (e.g., 314, FIG. 3) is being executed. Displayed posts data 532 includes displayed post entries 534, for example entry 1 (534-1) through entry z (534-z), where z represents the number of entries in displayed posts data 120. A respective entry 534 includes a user identifier 536. In some embodiments, the respective entry 534 includes one or more of: the number 538 of displayed posts (by the user identifier 536), timestamp 540 of the last display of a post (by the user identifier 536), and affinity 542.

In some embodiments, the number 538 of displayed posts (by the user identifier 536) corresponds to the number of times posts authored or posted by the user identifier 536 (e.g., "Brian") have been displayed at client 102. In some embodiments, the number 538 of displayed posts corresponds to the number of times posts authored or posted by the user identifier 536 have been displayed at client 102 during a predefined period (e.g., past 12 hours). In some embodiments, the number 538 corresponds to a cumulative number of posts by the user identifier 536 that have been displayed at client 102 as adjusted by a predefined discount factor (e.g., the number is multiplied by an exemplary discount factor, such as 0.5, at every predefined time interval, such as at 12 AM everyday).

The timestamp 540 corresponds to the last (or most recent) display of a post authored or posted by the user identifier 536.

Affinity 542 (e.g., the affinity 542-1 associated with entry 534-1 for posts associated with a respective user identifier 536-1) is a value that represents an importance and/or frequency of communication between the contact, corresponding to user identifier 536, and the respective user. Affinity 542 may be set by the user (e.g., by adding the respective contact to a particular group, such as "family," or by manually indicating that the respective contact is important). In some embodiments, affinity 542 for a respective contact is determined by a computer system without human intervention based on, for example, the frequency of communication between the user and the respective contact (e.g., a number of emails exchanged between the two in a predefined time period).

Optionally, the respective entry 534 may include additional information associated with the user identifier 536 or posts posted by the user identifier 536.

It should be appreciated that although number 538, timestamp 540, and affinity 542 are illustrated as included in displayed posts data 120 of client 102 (FIG. 1), one or more of number 538, timestamp 540, and affinity 542 may be stored in integration system 108 (FIG. 1). For example, affinity 542 may be stored in integration system 108, and in some embodiments, client 102 receives affinity 542 for a respective user identifier 536 from message server 114.

Figure 6A:
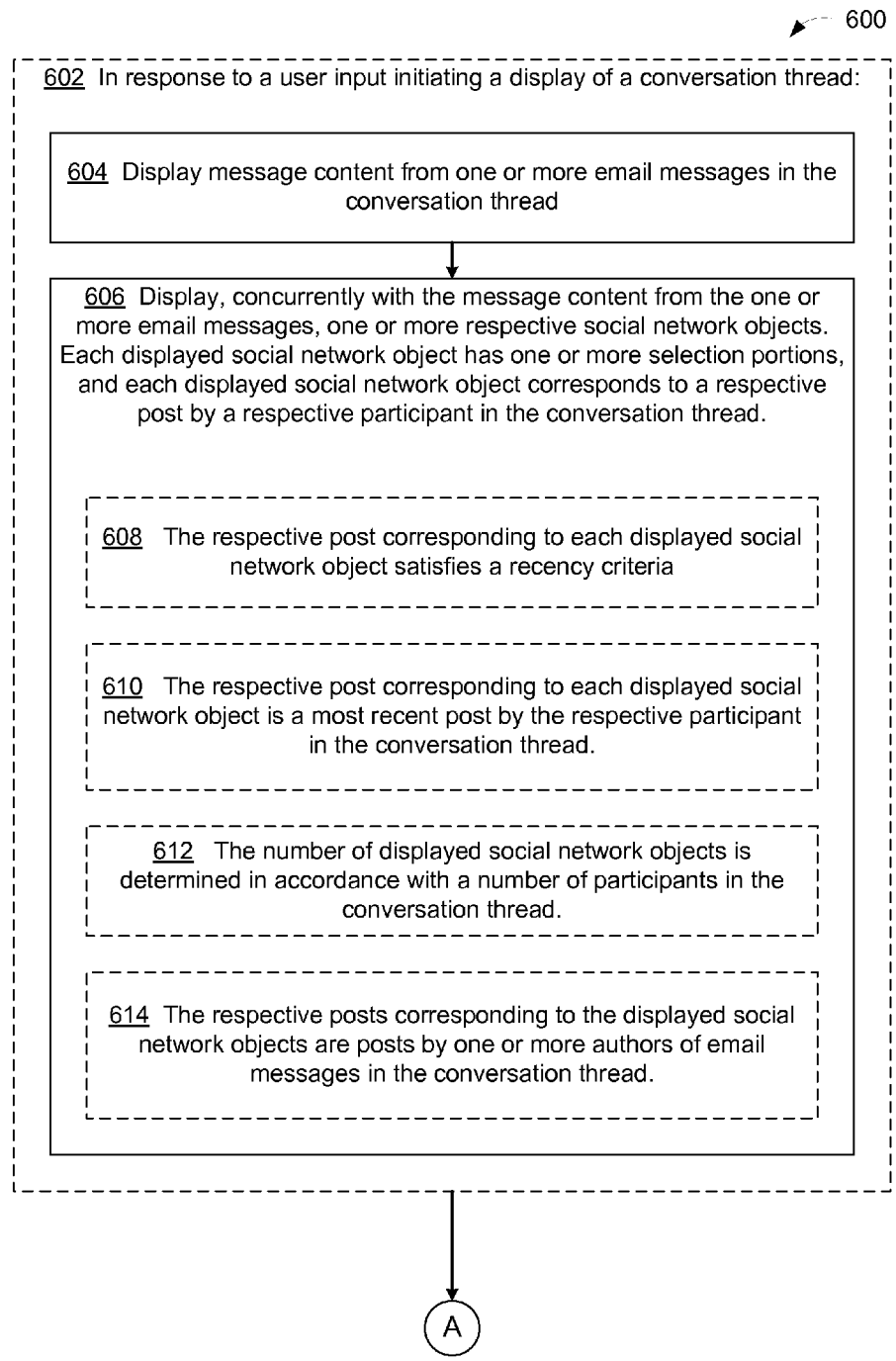

FIGS. 6A-6B are flowcharts representing method 600 of concurrently displaying message content and one or more social network objects, in accordance with some embodiments. The method is performed by (and at) a client device having one or more processors and memory storing one or more programs for execution by the one or more processors (e.g., client 102, described above with reference to FIG. 3).

As described below, method 600 allows integration of email messages and social network posts. By concurrently displaying email messages (or message content thereof) and one or more social network posts (or social network objects corresponding thereto), method 600 reduces the need to switch between a display of email messages and a display of social network posts. Furthermore, the displayed social network posts are by participants in the email messages, and therefore, the user may respond to, or comment on, the information in the social network posts without changing the display. Thus, method 600 reduces the time in navigating between the two displays, and provides a better human-machine interface.

In some embodiments, in response to a user input initiating a display of the conversation thread (602), the client displays message content and concurrently displays one or more social network objects. For example, the user input initiating the display of the conversation thread may include user selection of a conversation (e.g., a user interface object representing the conversation) in a displayed list of conversations. Selection of the conversation in the list of conversations causes a request to be sent to a server system (e.g., integration system 108) for a list of messages, including message content from one or email messages in the selected conversation, in the user's email account. In response, the server system sends, to the requesting client, message content from one or more email messages in the conversation thread. In another example, the user input initiating the display of the conversation thread may include, while displaying message content from a first set of one or more email messages in a view other than a conversation view, a user selection of a user interface object that is configured to display the message content from a second set of one or more email messages in the conversation thread. The view other than a conversation view may include a sequential view where the one or more email messages are sequentially arranged based on when respective email messages are received or authored.

The client displays (604) message content (received from the server system) from one or more email messages in a conversation thread (e.g., email messages 410 and 412-1 through 412-3, FIG. 4). In some embodiments, the displayed message content includes a snippet of a message, the entire message body (also called the full content of the respective email message), or the portion of a message body that fits within an available display region. As used herein, the term "email message" means a message sent from an author to one or more specific email addresses. The email message is generally delivered to every valid, active email address listed in the to field, cc field and bcc field of the email address.

In contrast, social network posts, also called posts, have specified access rights, and are typically not sent to every person with the right to access the posts. The client displays (606), concurrently with the message content from the one or more email messages, one or more respective social network objects. Each displayed social network object has one or more selection portions (e.g., author 422, rating icon 426, comment icon 428, and link 424, FIG. 4), and each displayed social network object corresponds to a respective post by a respective participant in the conversation thread (e.g., social network objects 420-1 and 420-2 corresponding to social network posts authored by participants in the conversation thread, Brian and Sam, FIG. 4). Each social network object includes a snippet of text, or the entire text in the corresponding social network post. Each social network object typically includes a name of the author of a corresponding social network post (e.g., a real name, user name, nick name, etc.). In some embodiments, when the corresponding social network post is posted using a user name, the user name is converted to a real name in the respective social network object. The social network posts may be stored in a social network posts database (e.g., 118, FIG. 1).

As used herein, the term "author" is used with respect to a social network post to describe that a respective post is posted by a respective user. Therefore, the respective user may author the respective post by commenting on, or sharing or reposting, a post originally written by another user. In other circumstances, content of a respective post contains original text authored by the respective user.

In some embodiments, the respective post corresponding to each displayed social network object satisfies (608) a recency criteria (e.g., posts authored within a predefined interval, such as past 24 hours).

In some embodiments, the respective post corresponding to each displayed social network object is (610) a most recent post by the respective participant in the conversation thread (e.g., when the respective participant has authored two social network posts, the most recent post is selected for generating a corresponding social network object).

In some embodiments, the number of displayed social network objects is determined (612) in accordance with a number of participants in the conversation thread. For example, the number of displayed social network objects (e.g., 420, FIG. 4) typically does not exceed the number of participants in the conversation thread. In some embodiments, the number of displayed social network objects is determined in accordance with the number of participants in the conversation thread other than the user of the client (e.g., the number of participants in a conversation thread involving Brian, Rachel, Tom, Sam, and the user "me" (FIG. 4) is four).

In some embodiments, the respective posts corresponding to the displayed social network objects are (614) posts by one or more authors of email messages in the conversation thread. In some implementations, the authors are considered to be "active participants" in the conversation, and the method 600 displays a recent post (if any) for each active participant other than the user of the client.

In some embodiments, the respective posts corresponding to the displayed social network objects are selected in accordance with respective times when posts by respective participants were displayed last (e.g., when a respective participant's post was displayed recently, the respective participant's posts are not selected so that other less-recently-shown participants' posts can be displayed).

In some embodiments, the respective posts corresponding to the displayed social network objects are selected in accordance with the number of times posts by respective participants were displayed (e.g., when the respective participant's posts have been shown more than other participants' posts, the respective participant's posts are not selected so that other less-shown participants' posts can be displayed).

In response to user selection of a first portion of a respective social network object (e.g., author identifier 422, FIG. 4) of the one or more displayed social network objects, the client displays (616, FIG. 6B) a respective social network page of the participant who authored the respective post corresponding to the respective social network object. It is noted that the first portion of the social network object, and each of the other portions mentioned below, is an affordance. User selection of a respective affordance typically causes a corresponding request to be sent to a server system (e.g., integration system 108), which sends corresponding in information to the client for display. Alternatively, in some circumstances, user selection of a particular affordance may cause information locally stored at the client to be displayed.

In some embodiments, in response to user selection of a second portion (e.g., a text portion of social network object 420, such as "This is the most awesome video I've watched in weeks. It is not the kind of video that I" for social network object 420-2, FIG. 4) of the one or more selectable portions of the respective social network object, the client displays (618) the entire post corresponding to the respective social network object. In some embodiments, the entire post corresponding to the respective social network object is displayed in a new window at the client device.

In some embodiments, in response to user selection of a third portion (e.g., rating icon 426-2, FIG. 4 and/or a corresponding score) of the one or more selectable portions of the respective social network object, the client adjusts (620) a score of the post corresponding to the respective social network object (e.g., increases a value in score 518, FIG. 5A). For example, the client adjusts the score by sending a message to integration system 108, which updates the score of the post corresponding to the respective social network object.

In some embodiments, in response to selection of a fourth portion of the one or more selectable portions of the respective social network object (e.g., comment icon 428-2, FIG. 4 and/or a corresponding number of comments), the client displays (622) the social network page and a predefined area for user entry of a comment.

Figure 7B:
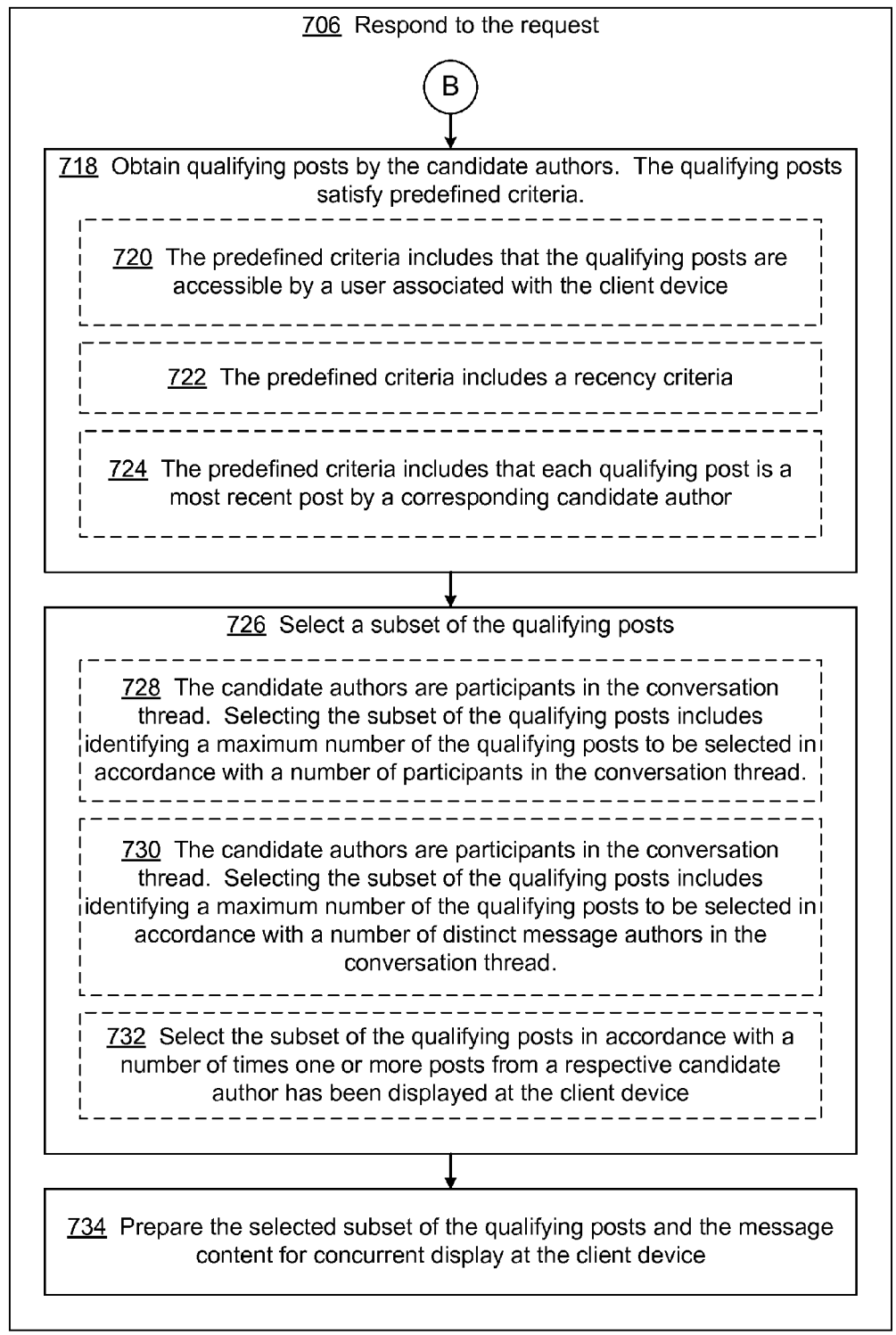

FIGS. 7A-7B are flowcharts representing method 700 of preparing a set of qualifying posts and message content for concurrent display, in accordance with some embodiments. The method is performed by (and at) a server system having one or more processors and memory storing one or more programs for execution by the one or more processors (e.g., integration system 108, described above with reference to FIG. 2).

The system receives (702) from a client device a request. The request includes a request for message content from one or more email messages in a conversation thread (e.g., a request for an email web page or a request to refresh/update the email web page).

In some embodiments, the request received from the client device includes (704) a request for information corresponding to one or more posts authored by one or more participants in the conversation thread. As noted above, participants in a conversation thread includes authors and recipients of messages in the conversation thread. In some embodiments, the request received from the client device includes a request for information corresponding to one or more posts authored by one or more authors (instead of all the participants) of messages in the conversation thread.

The system responds (706) to the request by identifying (708) the message content from the one or more email messages in the conversation thread. For example, the system first retrieves from message database 116 one or more messages (e.g., messages 410 and 412-1 through 412-3, FIG. 4) in the conversation thread. The conversation thread is related to the user associated with the client device (e.g., one or more messages are sent by or sent to the user associated with the client device).

The system identifies (710) candidate authors in accordance with the request. The candidate authors are typically a subset of the participants in the conversation thread identified by the request.

In some embodiments, identifying the candidate authors includes (712) identifying one or more candidate authors specified by the received request. For example, the request from the client device may include a subset of one or more user identifiers (e.g., 536, FIG. 5B) in the displayed posts data 120 stored by the requesting client. Thus, in some embodiments, the candidate authors specified by the received request are selected by the client device based on information available to the client device (e.g., displayed posts data 120, FIG. 1). In some embodiments, in response to receiving the candidate authors specified by the received request, the system determines whether social network posts database 118 (FIG. 1) includes posts by the candidate authors specified by the received request, and selects a subset of the candidate authors specified by the received request. In some embodiments, identifying the candidate authors includes identifying one or more candidate authors specified by the client device (e.g., the one or more candidate authors may be specified in the received request or via a separate communication).

In some embodiments, identifying the candidate authors includes (714) identifying one or more authors of messages in the conversation thread (e.g., Tom, Brian, and Sam who are authors of email messages 410 and 412-1 through 412-3 in FIG. 4). In some embodiments, identifying the candidate authors includes identifying one or more authors of messages in the conversation thread who are specified by the client device. In some cases, the client device may select and specify only some authors out of all authors of messages in the conversation thread (e.g., the client device may select authors based on their respective affinity 542 with the user, FIG. 5B).

In some embodiments, identifying the candidate authors includes (716) identifying one or more participants in the conversation thread (e.g., Tom, Brian, Rachael, and Sam who are participants in the conversation thread, FIG. 4). In some embodiments, identifying the candidate authors includes identifying one or more participants in the conversation thread who are specified by the client device. In some cases, the client device may select and specify only some participants out of all participants in the conversation thread (e.g., most relevant users).

The server obtains (718) qualifying posts by the candidate authors, where the qualifying posts satisfy predefined criteria. For example, the server identifies one or more user identifiers 506 (FIG. 5A) that correspond to the candidate authors, identifies one or more candidate posts 510 (FIG. 5A) corresponding to each identified user identifier 506, and retrieves one or more qualifying posts 510 among the one or more candidate posts 510.

In some embodiments, the predefined criteria includes (720) that the qualifying posts are accessible by a user associated with the client device. For example, the server determines whether the access scope 512 (FIG. 5A) of a respective candidate post 510 (FIG. 5A) includes the user associated with the client (or scope 512 of the respective candidate post 510 is set as "public").

In some embodiments, the predefined criteria includes (722) a recency criteria. For example, the server determines whether timestamp 516 (FIG. 5A) of the respective candidate post 510 (FIG. 5A) is within a predefined time period (e.g., within last N days).

In some embodiments, the predefined criteria includes (724) that each qualifying post is a most recent post by a corresponding candidate author. For example, the system may select the most recent post among multiple posts 510 (FIG. 5A) for a respective user identifier 506 in accordance with corresponding timestamps 516.

The system selects (726) a subset of the qualifying posts (e.g., the server selects a predefined number of qualifying posts out of all qualifying posts).

As noted above, in some embodiments, the candidate authors are participants in the conversation thread, and selecting the subset of the qualifying posts includes identifying a maximum number of the qualifying posts to be selected in accordance with a number of participants in the conversation thread (728). In some embodiments, the number of selected qualifying posts matches the number of participants in the conversation thread (e.g., up to one qualifying post for each participant. In some embodiments, the number of participants excludes the user associated with the client device. In some embodiments, the number of participants for whom posts are selected comprises a number of participants who have corresponding posts that meet the predefined criteria (qualifying participants).

In some embodiments, the candidate authors are participants in the conversation thread, and the subset of the qualifying posts includes identifying a maximum number of the qualifying posts to be selected in accordance with a number of distinct message authors in the conversation thread (730). In some implementations, the number of selected qualifying posts matches the number of distinct authors of email messages in the conversation thread (e.g., one qualifying post for each distinct author), excluding the user associated with the client device.

In some embodiments, the server selects (732) the subset of the qualifying posts in accordance with a number of times one or more posts from a respective candidate author has been displayed at the client device. In some embodiments, the server receives the number 538 (FIG. 5B) of times one or more posts by a respective user identifier 536 has been displayed at the client device (e.g., 102, FIG. 1), and selects qualifying posts by user identifiers that have the least number 538 of displayed posts.

In some embodiments, selecting the subset of the qualifying posts includes selecting a subset of the qualifying posts in accordance with a predefined number of qualifying posts. For example, when the predefined number is 3 and the number of qualifying posts is 3 or more, the system selects 3 qualifying posts. When the number of qualifying posts is less than 3, the system selects all qualifying posts.

In some embodiments, each qualifying post has a selection score, which corresponds to a weighted-average of component scores, in accordance with a predefined set of weights to be applied to a predefined set of component scores. Each component score corresponds to one or more values stored at the server system (e.g., scope 512, timestamp 516, and/or score 518) and/or one or more values stored at the client device (e.g., number of displayed posts 538, timestamp of last display 540, and/or affinity 542). In some embodiments, selecting the subset of the qualifying posts includes selecting a subset of the qualifying posts in accordance with the selection score.

In some embodiments, selecting the subset of the qualifying posts includes selecting a subset of the qualifying posts in accordance with one or more predefined tie breaker rules. For example, when two or more candidate posts have the same selection score, at least a candidate post authored by an author who has authored the most recent email message in the conversation thread between the authors of the two or more candidate posts with the same selection score is selected.

The server prepares (734) the selected subset of the qualifying posts and the message content for concurrent display at the client device. For example, the server prepares a webpage (or an XML file) that includes the selected subset of the qualifying posts and the message content (e.g., the webpage that is displayed as user interface 400 in FIG. 4), and sends the webpage to the client device for display. In some embodiments, the server prepares the webpage using presentation module 220 (FIG. 2).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, performed by a client device having one or more processors and memory storing one or more programs for execution by the one or more processors, comprising:

at the client device:

in response to a user input requesting display of a user-selected email thread, displaying message content from one or more email messages in the user-selected email thread;

displaying, concurrently with the message content from the one or more email messages, a plurality of respective social network objects distinct from the message content, wherein the plurality of social network objects are displayed in a display region reserved for non-email content, each displayed social network object corresponding to a single post by a respective participant in the email thread and having a content portion from only the single respective post to a social network by the respective participant in the email thread and one or more selectable portions distinct from the content portion of the social network object, the plurality of displayed social network objects including social network objects corresponding to posts by a plurality of participants in the email thread; and in response to selection of a first selectable portion of a respective social network object of the one or more displayed social network objects, displaying a respective social network page of the respective participant who authored the respective post corresponding to the respective social network object;

wherein the client device is associated with a first user, who is a first participant of the plurality of participants in the user-selected email thread, and the number of said social network objects having content corresponding to posts by the plurality of participants in the email thread and displayed concurrently with the message content from the one or more email messages is determined in accordance with a number of participants, other than the first user, in the user-selected email thread.

2. The method of claim 1, further comprising, in response to selection of a second selectable portion of the one or more selectable portions of the respective social network object, displaying the entire post corresponding to the respective social network object.

3. The method of claim 1, further comprising, in response to selection of a third selectable portion of the one or more selectable portions of the respective social network object, adjusting a score of the single post corresponding to the respective social network object.

4. The method of claim 1, further comprising, in response to selection of a fourth selectable portion of the one or more selectable portions of the respective social network object, displaying the respective social network page and a predefined area for user entry of a comment.

5. The method of claim 1, wherein the single respective post corresponding to a respective displayed social network object satisfies a recency criteria.

6. The method of claim 1, wherein the single respective post corresponding to each displayed social network object satisfies a recency criteria.

7. The method of claim 1, wherein the single respective post corresponding to a respective displayed social network object is a most recent post by the respective participant in the user-selected email thread.

8. The method of claim 1, wherein the single respective post corresponding to each displayed social network object is a most recent post by the respective participant in the user-selected email thread.

9. The method of claim 1, wherein the respective posts corresponding to the displayed social network objects are posts by one or more authors of email messages in the user-selected email thread.

10. The method of claim 1, wherein each displayed social network object includes an author identifier.

11. The method of claim 1, wherein each displayed social network object includes a timestamp indicating when the single social network post was authored.

12. The method of claim 1, wherein the display region reserved for non-email content includes a region reserved for displaying social network objects.

13. A client system, comprising:
   one or more processors; and
   memory storing one or more programs for execution by the one or more processors, the one or more programs including instructions for:
      in response to a user input requesting display of a user-selected email thread, displaying message content from one or more email messages in the user-selected email thread;
      displaying, concurrently with the message content from the one or more email messages, a plurality of respective social network objects distinct from the message content, wherein the plurality of social network objects are displayed in a display region reserved for non-email content, each displayed social network object corresponding to a single post by a respective participant in the email thread and having a content portion from only the single respective post to a social network by the respective participant in the email thread and one or more selectable portions distinct from the content portion of the social network object, the plurality of displayed social network objects including social network objects corresponding to posts by a plurality of participants in the email thread; and
      in response to selection of a first selectable portion of a respective social network object of the one or more displayed social network objects, displaying a respective social network page of the respective participant who authored the respective post corresponding to the respective social network object;
   wherein the client system is associated with a first user, who is a first participant of the plurality of participants in the user-selected email thread, and the number of said social network objects having content corresponding to posts by the plurality of participants in the email thread and displayed concurrently with the message content from the one or more email messages is determined in accordance with a number of participants, other than the first user, in the user-selected email thread.

14. The system of claim 13, wherein the one or more programs include instructions, enabled in response to selection of a second selectable portion of the one or more selectable portions of the respective social network object, for displaying the entire post corresponding to the respective social network object.

15. The system of claim 13, wherein the one or more programs include instructions, enabled in response to selection of a third selectable portion of the one or more selectable portions of the respective social network object, for adjusting a score of the single post corresponding to the respective social network object.

16. The system of claim 13, wherein the single respective post corresponding to each displayed social network object is a most recent post by the respective participant in the user-selected email thread.

17. The system of claim 13, wherein the respective posts corresponding to the displayed social network objects are posts by one or more authors of email messages in the user-selected email thread.

18. A non-transitory computer readable storage medium storing one or more programs configured for execution by one or more processors of a client system, the one or more programs comprising instructions for:
   in response to a user input requesting display of a user-selected email thread, displaying message content from one or more email messages in the user-selected email thread;
   displaying, concurrently with the message content from the one or more email messages, a plurality of respective social network objects distinct from the message content, wherein the plurality of social network objects are displayed in a display region reserved for non-email content, each displayed social network object corresponding to a single post by a respective participant in the email thread and having a content portion from only the single respective post to a social network by the respective participant in the email thread and one or more selectable portions distinct from the content portion of the social network object, the plurality of displayed social network objects including social network objects corresponding to posts by a plurality of participants in the email thread; and
   in response to selection of a first selectable portion of a respective social network object of the one or more displayed social network objects, displaying a respective social network page of the respective participant who authored the respective post corresponding to the respective social network object;
   wherein the client system is associated with a first user, who is a first participant of the plurality of participants in the user-selected email thread, and the number of said social network objects having content corresponding to posts by the plurality of participants in the email thread and displayed concurrently with the message content from the one or more email messages is determined in accordance with a number of participants, other than the first user, in the user-selected email thread.

19. The computer readable storage medium of claim 18, wherein the one or more programs include instructions, enabled in response to selection of a second selectable portion of the one or more selectable portions of the respective social network object, for displaying the entire post corresponding to the respective social network object.

20. The computer readable storage medium of claim 18, wherein the one or more programs include instructions, enabled in response to selection of a third selectable portion of the one or more selectable portions of the respective social network object, for adjusting a score of the single post corresponding to the respective social network object.

21. The computer readable storage medium of claim 18, wherein the respective posts corresponding to the displayed social network objects are posts by one or more authors of email messages in the user-selected email thread.

\* \* \* \* \*